Aug. 3, 1954
E. J. FUGLER
2,685,106
TIRE RECAPPING MACHINE
Filed March 6, 1952
4 Sheets-Sheet 1
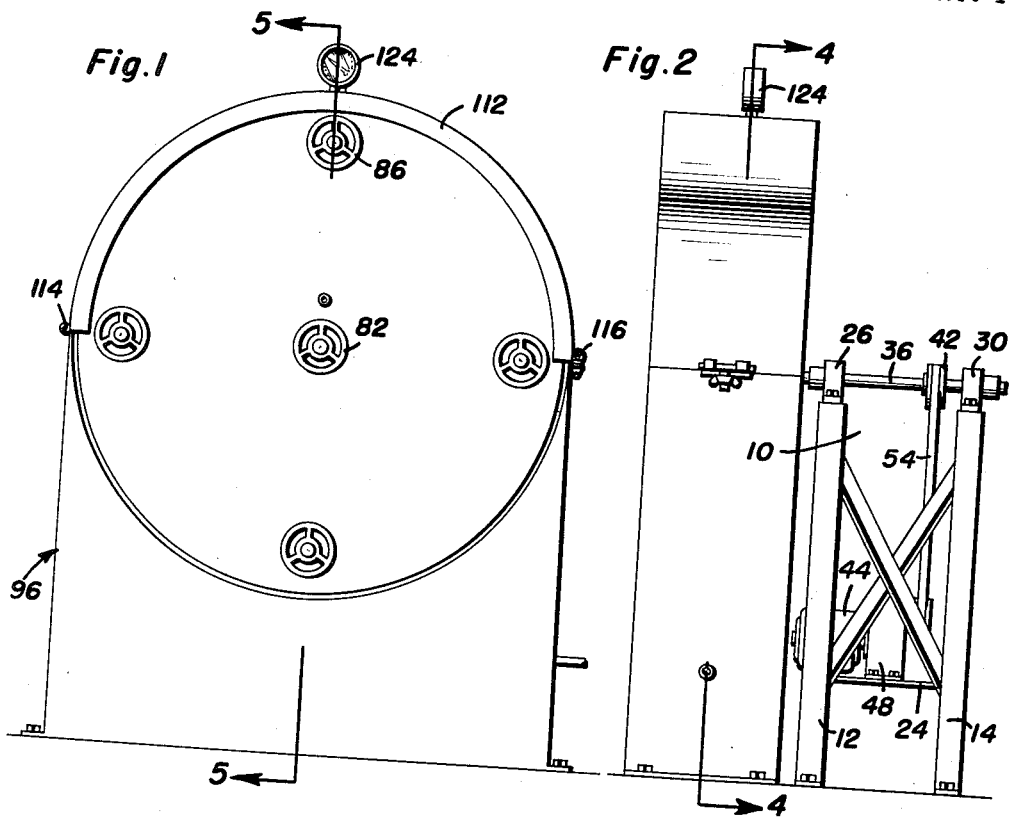
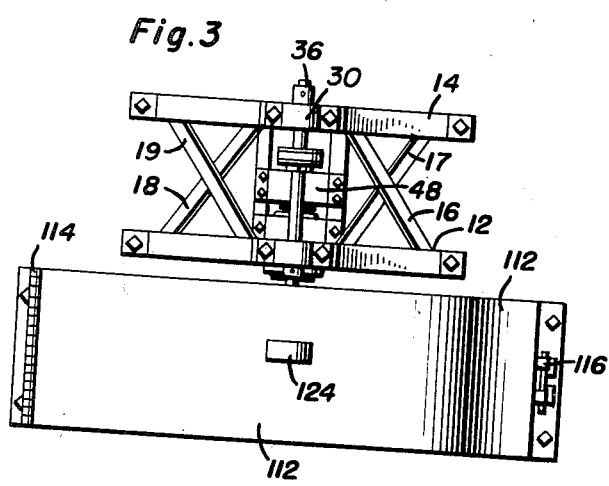
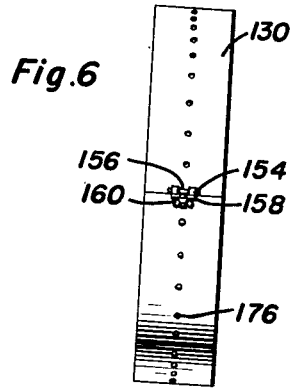
Edward J. Fugler
INVENTOR.
BY *Clarence A. O'Brien*
*and Harvey B. Jacobson*
Attorneys Aug. 3, 1954

E. J. FUGLER
TIRE RECAPPING MACHINE 2,685,106

Filed March 6, 1952

Edward J. Fugler
INVENTOR.

BY *Clarence A. O'Brien*
*and Harvey B. Jacobson*
Attorneys

Aug. 3, 1954  
E. J. FUGLER  
2,685,106  
TIRE RECAPPING MACHINE  
Filed March 6, 1952  
4 Sheets-Sheet 3
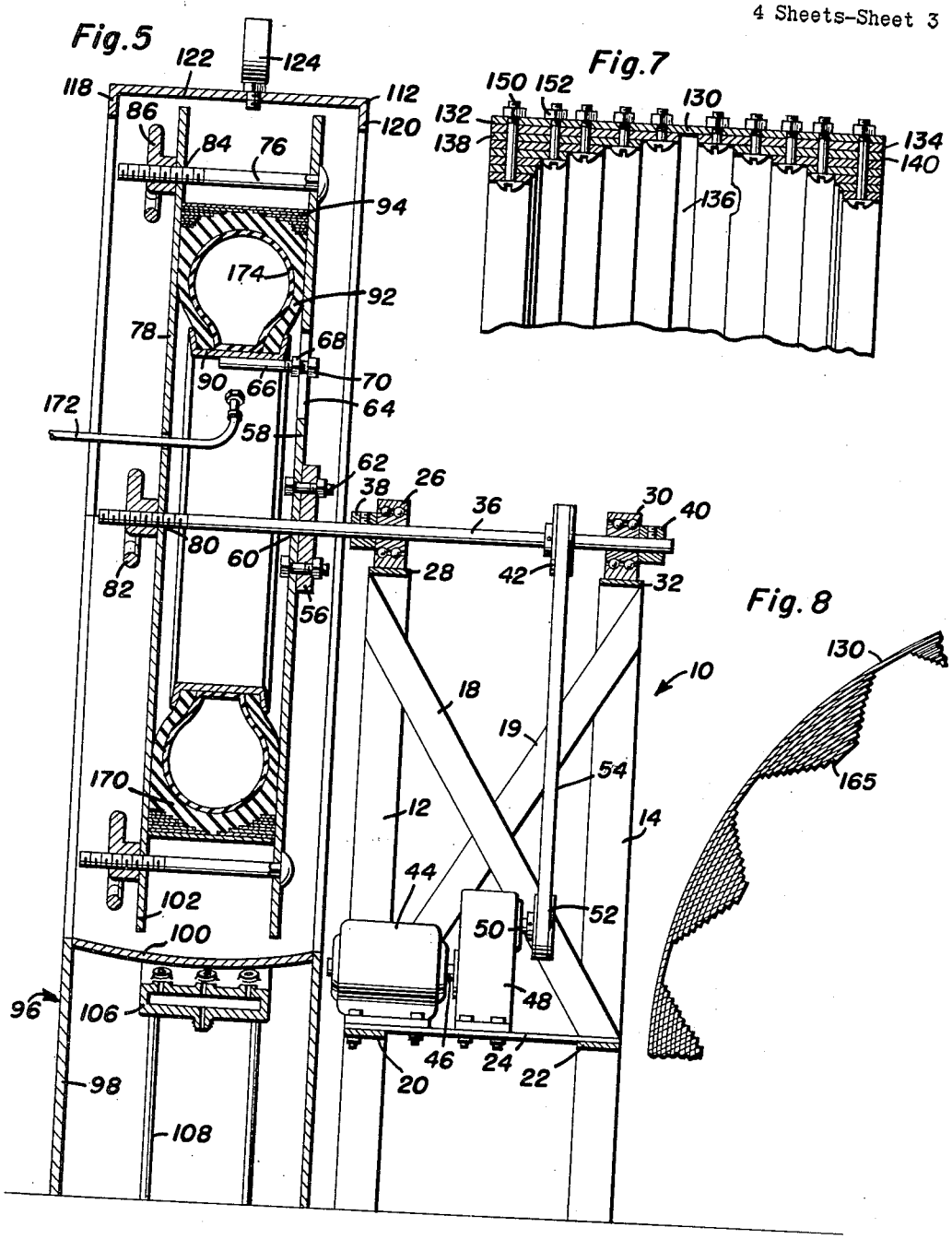
Edward J. Fugler
INVENTOR.

Aug. 3, 1954

E. J. FUGLER 2,685,106

TIRE RECAPPING MACHINE

Filed March 6, 1952

Edward J. Fugler
INVENTOR.

BY *Clarence A. O'Brien*
*and Harvey B. Jackson*
Attorneys

Patented Aug. 3, 1954

2,685,106

UNITED STATES PATENT OFFICE 2,685,106

TIRE RECAPPING MACHINE

Edward J. Fugler, Baton Rouge, La.

Application March 6, 1952, Serial No. 275,127

9 Claims. (Cl. 18—18)

This invention relates to a tire recapping machine and particularly to a light weight structure using a gas burner as the heating element.

In the recapping of automobile tires it has been customary to use heavy cast frames or structures in which to mount the tires while they are being recapped. The heavy molds in which the tires are placed are either heated by steam or electricity, resulting in a heavy, expensive piece of equipment for recapping tires. Because of the heavy nature of the structure for recapping tires it is necessary to use expensive foundations to properly install the recapping machines so that they will operate correctly.

The present invention relates to a recapping machine constructed of light weight structural parts with sheet metal forms for supporting a tire during reconstruction and a heater utilizing any suitable fuel such as a gas burner for maintaining the recapping temperature.

The structure, according to the present invention, comprises a frame on which a horizontal axle is mounted with the axle being driven at a slow rate of speed by means of any suitable motor device. The vulcanizing part proper comprises a pair of spaced apart plates and a matrix for forming the outer side of the tire. The matrix being heated by means of any suitable heater, preferably with a gas burner therein.

It is accordingly an object of this invention to provide an improved tire recapping machine.

A further object of this invention is to provide a tire recapping machine having light weight parts.

It is a further object of this invention to provide a matrix constructed of sheet metal.

It is still another object of this invention to provide a tire recapping machine having a gas burner to supply the necessary heat.

It is a further object of this invention to provide a tire recapping machine for providing section molds therein.

It is a further object of this invention to provide a tire recapping machine having side temperature guards except at a point where the repair of the tire is to be made.

Other objects and many of the attendant advantages of this invention will be apparent from the following detailed description taken in conjunction with the accompanying drawings in which:

Figure 1 is a front elevation of the recapping device according to the invention;

Figure 2 is a side elevation of the recapping device;

Figure 3 is a top plan view of the recapping device;

Figure 5 is an enlarged sectional elevation taken substantially on the plane indicated by the line 5—5 Figure 1;

Figure 6 is an elevation of the matrix;

Figure 7 is an enlarged cross section of a typical matrix;

Figure 8 is an enlarged section of a modified matrix;

Figure 4:
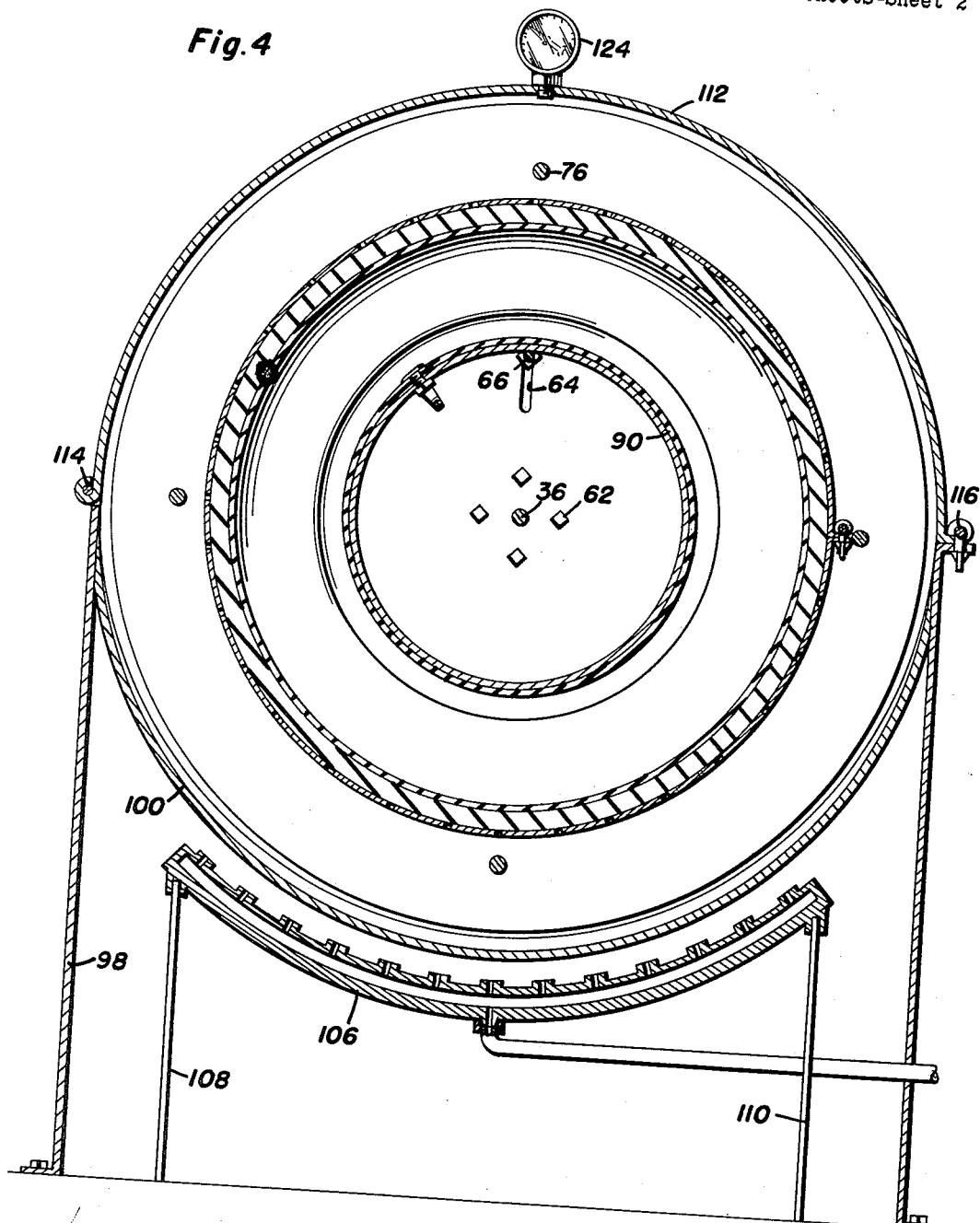
Figure 4 is an enlarged sectional elevation taken substantially on the plane indicated by the line 4—4 of Figure 2 and showing the respective arrangement of the parts.

In the exemplary embodiment of the invention a supporting frame 10 is constructed of a pair of substantially U-shaped legs 12 and 14. The legs 12 and 14 are separated by means of X-shaped brace members 16 and 17 and 18 and 19. The legs of the U-shaped member 12 are joined together by a cross member 20 and the legs of the U-shaped member 14 are joined together by cross member 22. The shelf-like member 24 being mounted on the cross members 20 and 22. A bearing 26 is mounted on the base 28 of the leg 12. A similar bearing 30 is mounted on the base 32 of the leg 14.

A horizontal shaft 36 is journaled in the bearings 26 and 30 and extends laterally to one side of the frame 10. A stop 38 is secured on the shaft 36 outside of the bearing 26 and a stop 40 is secured on the shaft 36 outside of the bearing 30. Stops 38 and 40 prevent lateral displacement of the shaft 36 in the bearings 26 and 30. A sheave 42 is mounted on the shaft 36 and a motor 44 is mounted on the shelf 24 and has a shaft 46 connected to a gear change box 48 which carries an output shaft 50 on which is mounted a sheave 52. A flexible drive element, such as a belt 54 is entrained over the sheaves 42 and 52 so that the motor drives the shaft 36 at a reduced rate of speed.

A coupling block 56 is secured on the shaft 36 by any suitable means such as welding or brazing. A circular plate 58 has a central aperture 60 and is secured to the block 56 by any suitable means such as the screw threaded fastener 62. The disc 58 is provided with a radial slot 64 in which is mounted a pin 66 which is adjustable in the slot 64 by means of lock nuts 68 and 70.

A plurality of clamping bolts 76 are arranged in annular formation about the edge of the disc 58. A clamping plate 78 provided with an aperture 80 is mounted on the shaft 36 and is secured thereon by means of a nut 82. The disc 78 is provided with apertures 84 for receiving the bolts 76 and the bolts 76 are held in position by means of hand nuts 86.

The pin 66 is utilized to support the rim 90 of a tire 92. The pin 66 being adjustable in the slot 64 so that the rim 90 is suspended substantially coaxial with the shaft 36. A matrix 94 which will presently be described in detail is mounted on the tire 92 and extends between the plates 58 and 78. Plates 58 and 78 are held in firm engagement with the matrix 94 by means of the hand nuts 86 and 82.

Heat is supplied to the matrix 94 by means of the heater assembly 96, which comprises a box-like frame 98 having a platform 100 substantially conforming to the shape of the discs 58 and 78 and being spaced therefrom by discs 102 and allowing air to circulate between the top of the heater and the edges of the discs 58 and 78. The top of the heater 100 is substantially semi-circular and encloses approximately one half of the discs 58 and 78. The heater 106 herein illustrated as a gas burner having legs 108 and 110 is mounted below the top 100 and supplies heat thereto. Preferably, the top 100 is slightly concave transverse thereof so that it provides a shallow dish for the retaining of water or other moisture producing material.

A hood 112 is connected to one end of the heater 96 by means of the hinge 114. The hood 112 extends over the discs 58 and 78 and in spaced relation thereto and contacts the end of the heater 96 and is secured thereto by means of the lock 116. The edges of the hood 112 are provided with flanges 118 and 120 which are laterally spaced from the positions of the discs 58 and 78 and extend inwardly sufficient to cover the aperture 122 between the edges of the disc and the hood 112. A temperature indicating device 124 is mounted on the hood 112 and if desired the temperature in the device may be automatically controlled by any suitable means connected to the temperature indicating device 124.

The matrix 94 is constructed of sheet metal and consists of an outer annular band 130 and a plurality of pairs of annular bands snugly fitted therein. The first pair of bands 132 and 134 fit snugly within the band 130 and the pair of bands 132 and 134 are of jointly less width than the band 130 to provide a spaced or ribbed channel 136 between the bands 132 and 134. A second pair of bands 138 and 140 fit snugly within the bands 132 and 134 and are of less width than the bands 132 and 134 to provide a second ribbed channel therein. Any desired number of pairs of bands may be utilized with each pair of bands fitting snugly within the next larger size bands and being of successively narrower width to provide wider channels for fitting the tire therein. The bands are all snugly and firmly connected together by means of bolts 150 having nuts 152. Preferably the matrix 94 is cut to provide a plurality of matching sections which may be fastened together by means of a lock 154 which preferably comprises a T-bolt 156 engaging a hasp 158 and secured by means of a wing nut 160. Obviously the lock 154 may be disengaged to facilitate the removal of the matrix from the finished tire.

Instead of the regular ribs as provided by the matrix in Figure 7, shaped ribs may be formed as shown by the matrix in Figure 8 in which the outside band 130 is provided with a plurality of shaped inserts 165. Obviously, these inserts 165 can be of any size, shape or formation to construct any simple tread on the tire 92.

In the operation of the devices so far described the pin 66 is arranged substantially vertically of the shaft 36 and adjusted so that the rim 90 is concentric with the shaft 36 with the tire 92 being trimmed down and having a mass of camelback 170 applied thereto. Matrix 94 is preferably applied to the tire and the camelback, before it is inserted within the recapping machine. After the tire and the matrix have been placed in the correct position the plate 78 is applied and screwed down tight so that the plates 78 and 58 are in firm contact with the matrix 94. Air is inserted through the tube 172 to expand an inner tube 174 and force the camelback 170 into the matrix 94. Preferably the matrix ring 130 is provided with a plurality of apertures 176 to permit air to readily escape from between the camelback and the matrix. Heat is applied to the heater 96 by means of the burner 106 and the temperature is raised to a temperature sufficient to vulcanize the camelback therein. The tire meanwhile being rotated at a velocity of 6 to 10 revolutions per minute so that there is no local overheating but a constant continuous heating of the camelback so that it is properly cured therein.

Figure 9:
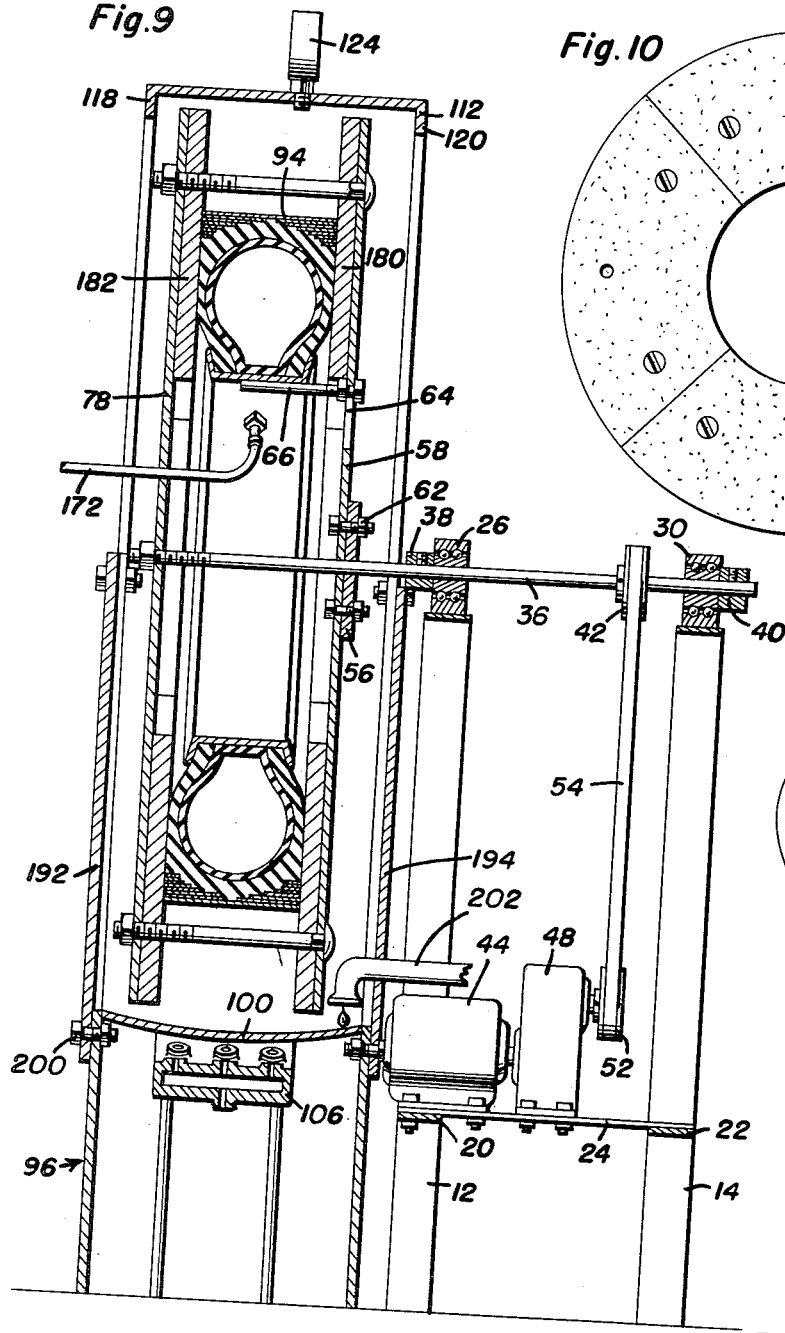
Figure 9 is a view similar to Figure 5 and showing a modification according to the invention.
Figure 10:
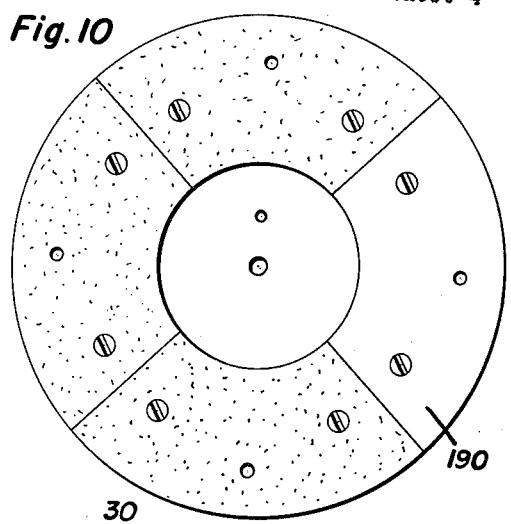
Figure 10 is a plan view of the side heat control elements.

During the vulcanization of the camelback, it is desirable to protect the side of the tire from the vulcanizing heat and for this reason as shown in Figure 9 insulating shields 180 and 182 are applied to the inner surfaces of the discs 58 and 78. The discs 180 and 182 are preferably constructed of light insulating material such as wood, fiber or the like. The heat insulating discs 180 and 182 are preferably constructed of a plurality of segments for a purpose presently to be described.

It is frequently desirable to put patches or sections in casings and for this purpose it has heretofore been customary to provide so-called section molds for applying such patches or sections. These patch-applying sections have been extremely expensive and cumbersome to handle.

The present invention provides a means for inserting a patch or section in the side of the tire as may be desired. In order to vulcanize a patch in the side of a tire a section on the insulating discs 180 and 182 may be removed and a section 190 of heat conducting material supplied thereof. Obviously, the section 190 will be of the approximately right size to cover the patch or insert in the tire and as many patches or inserts may be made as necessary.

Figure 11:
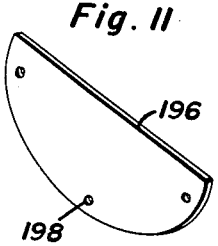
Figure 11 is a perspective view of the closure plate for side heating of the mold.

In order to secure proper distribution of the heat to the heat conducting section 190 closure members 192 and 194 are applied to the heater 96 and substantially enclose the lower parts of the rotating tire supporting structure up to the shaft 36. As seen in Figure 11, closures 192 and 194 are substantially semi-circular discs 196 provided with apertures 198 for receiving the bolts 200.

The operation of this modification of the device is accomplished by placing the tire in position as before except that any side structure which is to be repaired will be mounted adjacent to a conducting sector 190. While the remaining side walls of the tire will be protected by the insulating sectors 180 or 182 and the heat retaining sections 192 and 194 will be secured in place so that the side walls of the tire will be substantially heated to vulcanizing temperature the same as the matrix 94.

It is frequently desirable to maintain the humidity within the vulcanizing machine at a higher level than would be produced by heating the normal surrounding atmosphere. To supply the desired moisture a spout 202 is introduced through the plate 194 so that water or other steam forming material, from a source not shown, may be dropped on the heater 108. The devolution of steam within the chamber containing the rotating plates 58 and 78 together with the tire and the matrix therefor increases the humidity within the vulcanizing chamber.

The rotation of the plates 58 and 78 together with the contained structure causes a circulation of air through the vulcanizing chamber so there is little danger of accumulation of explosive gasses from the camelback being cured.

It will thus be seen that the present invention provides a cheap, light weight, easily constructed and easily mounted vulcanizing machine utilizing any convenient source of heat for producing the vulcanizing temperature. Because of its light weight, the structure requires no particularly strong foundation and may be readily set up and operated in any convenient place.

For purposes of exemplification a particular embodiment of the invention has been shown and described according to the best present understanding thereof, however, it will be apparent to those skilled in the art that various changes and modifications can be made therein without departing from the true spirit of the invention.

Having described the invention, what is claimed as new is:

1. A tire recapping machine comprising a frame, a shaft rotatably mounted on said frame, a pair of annular plates secured on said shaft, means for supporting a tire coaxially with said shaft, a matrix engaging the outer face of said tire, said matrix filling the space between said plates, a heater mounted below said plates, means for rotating said shaft, a semi-annular hood hinged on said heater and extending over said plates.

2. A tire recapping machine comprising a frame, a horizontal shaft journaled on said frame, a circular plate rigidly secured on said shaft at one side of said frame, said plate having a radial slot therein, a pin adjustably mounted in said slot, said pin extending parallel to said shaft, said pin supporting a tire on said plate, a matrix for receiving a tire supported on said pin, a second circular plate, securing means extending between said plates, a substantially semi-annular heater positioned below and enclosing the lower portion of said plates, there being an air space between the edge of said plates and the surface of said heater, a semi-annular hood hinged to one end of said heater, said hood extending over said plates and being secured to the other end of said heater.

3. A tire recapping machine comprising a frame, a horizontal shaft journaled on said frame, a circular plate rigidly secured on said shaft at one side of said frame, said plate having a radial slot therein, a pin adjustably mounted in said slot, said pin extending parallel to said shaft, said pin supporting a tire on said plate, a matrix for receiving a tire supported on said pin, a second circular plate, securing means extending between said plates, a substantially semi-annular heater positioned below and enclosing the lower portion of said plates, there being an air space between the edge of said plates and the surface of said heater, a semi-annular hood hinged to one end of said heater, said hood extending over said plates and being secured to the other end of said heater, said hood being spaced from the edges of said plates, inturned flanges on said hood, said flanges extending in spaced relation to the sides of said plates.

4. A tire recapping machine comprising a frame, a horizontal shaft journaled on said frame, a circular plate rigidly secured on said shaft at one side of said frame, said plate having a radial slot therein, a pin adjustably mounted in said slot, said pin extending parallel to said shaft, said pin supporting a tire on said plate, a matrix for receiving a tire supported on said pin, a second circular plate, securing means extending between said plates, a substantially semi-annular heater positioned below and enclosing the lower portion of said plates, there being an air space between the edge of said plates and the surface of said heater, a semi-annular hood hinged to one end of said heater, said hood extending over said plates and being secured to the other end of said heater, said hood being spaced from the edge of said plates, inturned flanges on said hood, said flanges extending in spaced relation to the sides of said plates, substantially semi-circular closures applied to each side of said heater, said closures being in laterally spaced relation to said plates and extending substantially adjacent to said shaft.

5. A tire recapping machine comprising a frame, a horizontal shaft journaled on said frame, a circular plate rigidly secured on said shaft at one side of said frame, said plate having a radial slot therein, a pin adjustably mounted in said slot, said pin extending parallel to said shaft, said pin supporting a tire on said plate, a matrix for receiving a tire supported on said pin, a second circular plate, securing means extending between said plates, a substantially semi-annular heater positioned below and enclosing the lower portion of said plates, there being an air space between the edge of said plates and the surface of said heater, a semi-annular hood hinged to one end of said heater, said hood extending over said plates and being secured to the other end of said heater, said hood being spaced from the edge of said plates, inturned flanges on said hood, said flanges extending in spaced relation to the sides of said plates, substantially semi-circular closures applied to each side of said heater, said closures being in laterally spaced relation to said plates and extending substantially adjacent to said shaft, a heat insulating lining on said plates in the region contacting a tire.

6. A tire recapping machine comprising a frame, a horizontal shaft journaled on said frame, a circular plate rigidly secured on said shaft at one side of said frame, said plate having a radial slot therein, a pin adjustably mounted in said slot, said pin extending parallel to said shaft, said pin supporting a tire on said plate, a matrix for receiving a tire supported on said pin, a second circular plate, securing means extending between said plates, a substantially semi-annular heater positioned below and enclosing the lower portion of said plates, there being an air space between the edge of said plates and the surface of said heater, a semi-annular hood hinged to one end of said heater, said hood extending over said plates and being secured to the other end of said heater, said hood being spaced from the edge of said plates, inturned flanges on said hood, said flanges extending in spaced relation to the sides of said plates, substantially semi-circular closures applied to each side of said heater, said closures being in laterally spaced relation to said plates and extending substantially adjacent to said shaft, a heat insulating lining on said plates in the region contacting a tire, means for maintaining the humidity in said machine.

7. A tire recapping machine comprising a frame, a horizontal shaft journaled on said frame, a circular plate rigidly secured on said shaft at one side of said frame, said plate having a radial slot therein, a pin adjustably mounted in said slot, said pin extending parallel to said shaft, said pin supporting a tire on said plate, a matrix for receiving a tire supported on said pin, a second circular plate, securing means extending between said plates, a substantially semi-annular heater positioned below and enclosing the lower portion of said plates, there being an air space between the edge of said plates and the surface of said heater, a semi-annular hood hinged to one end of said heater, said hood extending over said plates and being secured to the other end of said heater, said hood being spaced from the edges of said plates, inturned flanges on said hood, said flanges extending in spaced relation to the sides of said plates, motor driven means for rotating said shaft.

8. A tire recapping machine comprising a frame, a horizontal shaft journaled transversely of said frame, said shaft extending laterally of one side of the frame, a sheave on said shaft, a motor mounted in said frame, a sheave driven by said motor, a flexible drive element entrained over said sheaves, a circular plate secured on said shaft and coaxial therewith, said plate having a radially disposed slot therein, a pin mounted in said slot, means for adjustably securing said pin in said slot, said pin extending substantially parallel to said shaft, said pin adapted to support a tire rim substantially coaxial with said shaft, an annular matrix enclosing a tire mounted on said rim, a second plate mounted on said shaft, a plurality of clamping bolts adjustably clamping said plates into firm contact with said matrix, a heater mounted below said plates, said heater having a substantially semi-annular top spaced from the edge of said plates, a hood mounted on said heater, said hood extending in spaced relation from the top edge of said plates.

9. A tire recapping machine comprising a frame, a horizontal shaft journaled transversely of said frame, said shaft extending laterally of one side of the frame, a sheave on said shaft, a motor mounted in said frame, a sheave driven by said motor, a flexible drive element entrained over said sheaves, a circular plate secured on said shaft and coaxial therewith, said plate having a radially disposed slot therein, a pin mounted in said slot, means for adjustably securing said pin in said slot, said pin extending substantially parallel to said shaft, said pin adapted to support a tire rim substantially coaxial with said shaft, an annular matrix enclosing a tire mounted on said rim, a second plate mounted on said shaft, a plurality of clamping bolts adjustably clamping said plates into firm contact with said matrix, a heater mounted below said plates, said heater having a substantially semi-annular top spaced from the edge of said plates, a hood mounted on said heater, said hood extending in spaced relation from the top edge of said plates, said heater being downwardly curved transversely thereof, means for supplying water on the top of said heater.

References Cited in the file of this patent

UNITED STATES PATENTS

| Number | Name | Date |
|---|---|---|
| 2,155,906 | Rihn et al. | Apr. 25, 1939 |
| 2,415,291 | Kreyer | Feb. 4, 1947 |
| 2,587,297 | Duerksen | Feb. 26, 1952 |

FOREIGN PATENTS

| Number | Country | Date |
|---|---|---|
| 505,903 | Great Britain | May 16, 1939 |